United States Patent
Dyck et al.

(10) Patent No.: US 6,994,788 B1
(45) Date of Patent: Feb. 7, 2006

(54) SULFONATED AROMATIC POLYMERS, MEMBRANE CONTAINING SAID POLYMERS AND A METHOD FOR PRODUCTION AND USE OF THE SAME

(75) Inventors: Alexander Dyck, Geesthacht (DE); Thomas Soczka-Guth, Schelklingen (DE)

(73) Assignee: PEMEAS GmbH, (DE)

( * ) Notice: Subject to any disclaimer, the term of this patent is extended or adjusted under 35 U.S.C. 154(b) by 0 days.

(21) Appl. No.: 09/914,704

(22) PCT Filed: Mar. 1, 2000

(86) PCT No.: PCT/EP00/01785

§ 371 (c)(1),
(2), (4) Date: May 23, 2002

(87) PCT Pub. No.: WO00/51716

PCT Pub. Date: Sep. 8, 2000

(30) Foreign Application Priority Data

Mar. 2, 1999 (DE) .................. 199 09 028

(51) Int. Cl.
*B01D 39/16* (2006.01)

(52) U.S. Cl. .................. 210/500.27; 210/500.28; 210/500.33; 210/500.37; 210/500.4; 210/500.41; 525/534; 525/535; 525/471; 525/906; 429/12; 526/293

(58) Field of Classification Search .......... 210/500.27, 210/500.28, 500.33, 500.37, 500.38, 500.39, 210/500.4, 500.41; 525/534, 535, 471, 906; 429/12; 526/293; 95/45, 52, 54; 96/8, 13
See application file for complete search history.

(56) References Cited

U.S. PATENT DOCUMENTS

| | | | |
|---|---|---|---|
| 4,971,695 A | * | 11/1990 | Kawakami et al. .... 210/500.23 |
| 5,071,448 A | | 12/1991 | Bikson et al. ................. 55/16 |
| 5,364,454 A | | 11/1994 | Bikson et al. ................. 95/45 |
| 5,618,334 A | * | 4/1997 | Ozcayir et al. ................ 96/14 |
| 5,834,566 A | | 11/1998 | Helmer-Metzmann et al. ......... 525/535 |

FOREIGN PATENT DOCUMENTS

| | | |
|---|---|---|
| EP | 688824 | 12/1995 |
| WO | 9629359 | 9/1996 |
| WO | 9629360 | 9/1996 |

* cited by examiner

*Primary Examiner*—W. L. Walker
*Assistant Examiner*—Krishnan Menon
(74) *Attorney, Agent, or Firm*—Connolly Bove Lodge & Hutz

(57) ABSTRACT

A sulfonated aromatic polymer comprising the repeating structural unit of the formula I $$-\text{O}-\text{Ar}^1(\text{SO}_3\text{R})_n-\text{C}(\text{CF}_3)_2-\text{Ar}^1(\text{SO}_3\text{R})_n-\text{O}-\text{Ar}^2-(\text{X}-\text{Ar}^2)_m-, \quad (I)$$

in which $Ar^1$ and $Ar^2$ are, independently of one another, divalent aromatic or heteroaromatic radicals which are optionally substituted by one or more monovalent organic groups which are inert under the conditions of use, R is hydrogen, an alkali metal or alkaline earth metal ion or an ammonium ion, n is an integer from 0 to 3, m is 0, 1 or 2 and X is a —CO—, —O—, —$C_pH_{2p}$—, —$C_pF_{2p}$— or —S— group, in which p is an integer from 1 to 10, is described.

Membranes with high proton conductivities can be produced from this polymer and are preferably used in fuel cells.

27 Claims, No Drawings

SULFONATED AROMATIC POLYMERS, MEMBRANE CONTAINING SAID POLYMERS AND A METHOD FOR PRODUCTION AND USE OF THE SAME

The present invention relates to sulfonated aromatic polymers which are suitable in particular for producing membranes, and to the use thereof in fuel cells, high-performance capacitors and dialysis apparatuses.

Fuel cells are electrochemical energy converters which are distinguished, in particular, by their high level of efficiency. Polymer electrolyte fuel cells are distinguished among the various types of fuel cells by their high power density and their low weight to power ratio.

Conventional fuel cells usually operate with membranes based on fluorine-containing polymers, for example with the material Nafion®.

For further development of fuel cell technology, especially for use thereof on a larger scale, it is necessary to reduce the production costs for the materials employed without this necessarily taking place at the expense of loss of efficiency compared with materials conventionally used. If possible, the fluorine content of the membranes should also be reduced.

WO-A 96/29359 and WO-A 96/29360 describe polymeric electrolytes composed of sulfonated aromatic polyether ketones and the production of membranes from these materials.

EP-A 0 152 161 describes polyether ketones (called "PEK" hereinafter) consisting predominantly of the —O—Ar—CO—Ar—(Ar=divalent aromatic radical) repeating unit and shaped structures produced therefrom.

Sulfonated, strictly alternating polyether ketones with the —O—Ar—CO—Ar—repeating unit are described in J. Polym. Sci.: Vol. 23, 2205–2222, 1985. The structure of the polyether ketones in this case is the result of electrophilic attack, and not nucleophilic attack as described in EP-A 0 152 161. The polymers were sulfonated by sulfur trioxide using triethylphosphate in dichloroethane. Another sulfonation method used in this reference is chlorosulfonation with chlorosulfonic acid. However, a decline in molecular weight is also observed with this method, depending on the degree of sulfonation. Amidation of the acid chloride follows. A possible area of use for such polymers is stated to be the use as ion exchanger or as desalinator. Use in fuel cells is not described. Property profiles suggesting use in fuel cells are likewise not disclosed.

The production of sulfonated polyether ketones with bisphenol A units for use in osomosis and reverse osmosis (water desalination) is described in the relevant patent literature, for example in U.S. Pat. No. 4,625,000. It is to be expected that such polymers modified with sulfonic acid groups will be more hydrophobic than polyether ketones without bisphenol A units, and thus will favor the formation of water channels in a membrane. This in turn ought also to lead to high proton conductivities when the water contents of the membrane are low.

It has emerged from the attempt to sulfonate halogen-free polyether ketones with bisphenol A units using oleum, sulfuric acid or else chlorosulfonic acid at temperatures between 0 and 50° C. and that degradation of these polymers takes place.

The present invention provides high-efficiency polymers whose chemical stability has been increased by incorporating chemically inert hexafluorobisphenol A units, which can be sulfonated with negligible degradation of the polymer, and which are more hydrophobic than conventional sulfonated PEEK or PEK types, and which allow membranes with improved mechanical properties to be produced.

Polyether sulfones containing hexafluorobisphenol A units are known. U.S. Pat. No. 4,971,695 and Polym. Mater. Sci. Eng. (1993), 68, 167–9 describe membranes made of such polymers for use in gas separation.

The present invention relates to a sulfonated aromatic polymer comprising the repeating structural unit of the formula (I)

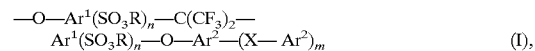

$$-O-Ar^1(SO_3R)_n-C(CF_3)_2-Ar^1(SO_3R)_n-O-Ar^2-(X-Ar^2)_m \quad (I),$$

in which $Ar^1$ and $Ar^2$ are, independently of one another, divalent aromatic or heteroaromatic radicals which are optionally substituted by one or more monovalent organic groups which are inert under the conditions of use, R is hydrogen, an alkali metal or alkaline earth metal ion or an ammonium ion, n is an integer from 0 to 3, m is 0, 1 or 2 and X is a —CO—, —O—, —$C_pH_{2p}$—, —$C_pF_{2p}$— or —S— group, in which p is an integer from 1 to 10.

If any of the radicals are divalent aromatic or heteroaromatic radicals, these are mononuclear or polynuclear aromatic hydrocarbon radicals or heterocyclic aromatic radicals which may be mononuclear or polynuclear. Heterocyclic aromatic radicals have, in particular, one or two oxygen, nitrogen or sulfur atoms in the aromatic radical.

Polynuclear aromatic radicals may be fused together or connected together by C—C bonds or via bridging groups such as —O—, —S—, —CO—, —$SO_2$— or —$C_oH_{2o}$—, where o is an integer from 1 to 10.

The valency bonds in the divalent aromatic or heteroaromatic radicals may be in the para position or in a comparable coaxial or parallel position or in the meta position or in a position at a comparable angle relative to one another.

The valency bonds in the coaxial or parallel position relative to one another are oppositely directed. An example of coaxial, oppositely directed bonds are biphenyl- 4,4'-ene bonds. An example of parallel oppositely directed bonds are the 1,5- or 2,6-naphthylene bonds, while the 1,8-naphthylene bonds are parallel in the same direction.

Examples of preferred divalent aromatic radicals $Ar^1$ or $Ar^2$ whose valency bonds are in the para position or in a comparable coaxial or parallel position are mononuclear aromatic radicals with free valencies in the para positions relative to one another, in particular 1,4-phenylene, or binuclear fused aromatic radicals with parallel, oppositely directed bonds, in particular 1,4-, 1,5- and 2,6-naphthylene, or binuclear aromatic radicals linked by a C—C bond and having coaxial, oppositely directed bonds, in particular 4,4'-biphenylene.

The valency bonds in the meta position or in a position at a comparable angle relative to one another are arranged at an angle.

Examples of preferred divalent aromatic radicals $Ar^1$ or $Ar^2$ whose valency bonds are in the meta position or in a position at a comparable angle relative to one another are mononuclear aromatic radicals with free valencies in the meta positions relative to one another, in particular 1,3-phenylene, or binuclear fused aromatic radicals with bonds directed at an angle relative to one another, in particular 1,6- and 2,7-naphthylene, or binuclear radicals linked by a C—C bond and having bonds directed at an angle relative to one another, in particular 3,4'-biphenylene.

Particularly preferred radicals $Ar^1$ or $Ar^2$ are 1,3-phenylene or, in particular, 1,4-phenylene.

The preferred sulfonated aromatic polymers are those comprising the repeating unit of the formula I defined above, in which $Ar^1$ and $Ar^2$ are, independently of one another, phenylene, naphthylene and/or biphenylene, in particular 1,3- and/or 1,4-phenylene.

Preferred sulfonated aromatic polymers comprising the repeating unit of the formula I defined above are those in which X is —CO—.

Preferred groups X and Y and/or Z are —CO—.

The aromatic radicals of the polymers of the invention can be substituted by inert groups. By this are meant substituents which have no adverse effects on the intended use.

Examples of such substituents are alkyl, alkoxy, aryl, amino, alcohol, ether, sulfonyl, phosphonyl, acyl, nitro, carboxylic acid or esters thereof or carboxamide groups or halogen.

Alkyl groups mean branched or, preferably, straight-chain alkyl radicals, for example alkyl with one to six carbon atoms, in particular methyl.

Alkoxy groups mean branched or, preferably, straight-chain alkoxy radicals, for example alkoxy radicals with one to six carbon atoms, in particular methoxy.

Amino groups mean radicals of the formula —$NH_2$, —$NHR^1$ or —$NR^1R^2$ in which $R^1$ and $R^2$ are, independently of one another, alkyl or aryl radicals, preferably methyl.

Alcohol groups mean radicals of the formula —OH.

Ether groups mean radicals of the formula $R^1$—O— in which $R^1$ has the meaning indicated above.

Sulfonyl groups mean radicals of the formula —$SO_2R^1$ in which $R^1$ has the meaning defined above.

Phosphonyl groups mean radicals of the formula —$P(OR_3)_3$ in which the $R^3$ radicals are, independently of one another, hydrogen, alkyl or aryl.

Acyl groups mean radicals of the formula —CO—$R^3$ in which $R^3$ has the meaning defined above.

Carboxylic acid groups mean radicals of the formula —COOH.

Carboxylic ester groups mean radicals of the formula —$COOR^1$ in which $R^1$ has the meaning defined above.

Carboxamide groups mean radicals of the formula —$CONH_2$, —$CONHR^1$ or —$CONR^1R^2$ in which $R^1$ and $R^2$ have the meaning defined above.

If any of the radicals are halogen, examples thereof are fluorine, bromine or, in particular, chlorine.

Preferred polymers comprising the repeating structural unit of the formula I are those in which $Ar^1$ and/or $Ar^2$ are, besides the sulfonyl groups which are necessarily present, substituted by one to four amino, alcohol, ether, alkyl, aryl, phosphonyl, acyl, nitro, carboxylic acid, carboxylic ester and/or carboxamide groups.

Very particularly preferred polymers comprising the repeating structural unit of the formula I are those in which $Ar^1$ and/or $Ar^2$ have no substituents apart from the sulfonyl groups which are necessarily present.

A characterizing feature of the polymers of the invention is their content of sulfonyl groups. These groups may be present in free form as acid groups or in the form of salts, for example of alkali metal, alkaline earth metal or ammonium salts.

A characterizing feature of the degree of sulfonation of the polymers of the invention is the ion exchange capacity thereof (also called "IEC" hereinafter). This is determined for the purposes of the present invention by elemental analysis of the washed and dried polymer through determination of the ratio of carbon to sulfur (C/S quotient).

Preferred sulfonated polymers comprising the repeating structural unit of the formula I are those having an ion exchange capacity of 0.5 to 3.0 meq ((—$SO_3H$)/g polymer), particularly preferably an IEC of 1.0 to 2.0 meq ((—$SO_3H$)/g polymer).

Preferred sulfonated aromatic polymers comprise besides the repeating structural unit of the formula I defined above the repeating structural unit of the formula II

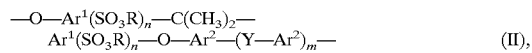

(II), in which $Ar^1$, $Ar^2$, R, m and n have the meaning defined herein before, and Y is a —CO—, —O—, —$C_pH_{2p}$—, —$C_pF_{2p}$—, —S— or —$SO_2$— group in which p is an integer from 1 to 10.

Preferred sulfonated aromatic polymers comprise besides the repeating structural unit of the formula I and, where appropriate, of the formula II, defined above, the repeating strutural unit of the formula III

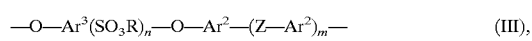

(III), in which $Ar^2$, R, m and n have the meaning defined hereinbefore, Z is a —CO—, —O—, —$C_pH_{2p}$—, —$C_pF_{2p}$—, —S— or —$SO_2$— group in which p is an integer from 1 to 10, and $Ar^3$ is a divalent aromatic or heteroaromatic radical optionally substituted by one or more monovalent organic groups which are inert under the conditions of use.

The polymers of the invention must have the repeating structural units of the formula I and may additionally have the repeating structural units of the formulae II and/or III. The ratios of the amounts of the structural units—if present—may vary.

It is preferred for the total of the molar proportion of the repeating structural unit of the formula I and, where appropriate, of the formula II in the polymers of the invention to be 10–50% and the molar proportion of the repeating structural unit of the formula III is 90–50%.

It is very particularly preferred for the molar proportion of the repeating structural unit of the formula I to be 100–10% and the molar proportion of the repeating structural unit of the formula II is 0–90%.

Very particularly preferred sulfonated aromatic polymers consist essentially of the repeating structural unit of the following formula

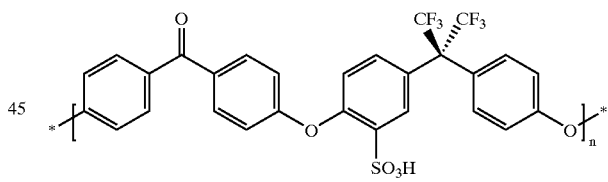

The polymers of the invention can be prepared by methods known per se.

Polyether ketones can be obtained by polycondensation of hexafluorobisphenol A or analogous fluorinated bisphenols and, where appropriate, with other bisphenols together with aromatic dihalo ketones. Polyethers can be obtained by polycondensation of hexafluorobisphenol A or analogous fluorinated bisphenols and, where appropriate, with other bisphenols together with aromatic dihalohydrocarbons or aromatic dihalo ethers.

Polysulfides can be obtained by polycondensation of hexafluorobisphenol A or analogous fluorinated bisphenols and, where appropriate, with other bisphenols together with aromatic dihalo thioethers.

The resulting polyether ketone, polyether or polysulfide intermediates are reacted in a subsequent stage with a suitable sulfonating agent, for example with oleum, sulfuric acid or thionyl chloride, until the desired degree of sulfonation has been reached.

The monomeric starting compounds employed, such as hexafluorobisphenol A bisphenol A, dibromphenylene, dichlorobenzophenone, are known per se.

The polymers of the invention are particularly suitable for producing membranes with excellent use properties.

The invention also relates to membranes comprising the polymers defined above.

The membranes of the invention normally have a thickness of greater than or equal to 5 μm, preferably of more than 10 μm, particularly preferably of from 10 to 150 μm, and very particularly preferably of from 20 to 60 μm. For fuel cell applications, the thickness of the membranes is usually at least 10 μm, and for applications as dielectric in capacitors the thickness of the membranes is usually at least 5 μm.

Polymer solutions differing in viscosity are preferably used, depending on the required thickness of the membrane. Polymer solutions preferably used for membranes from 5 to 60 μm thick have a viscosity of from 500 to 2 000 mPas (measured at 80° C. in a solution of the polymers in the relevant solvent). Polymer solutions preferably used for membranes from 10 to 150 μm thick have a viscosity of 1 500 to 5 000 mPas (measured at 80° C. in a solution of the polymers in the relevant solvent).

The membranes produced in this way have been tested in particular in relation to their mechanical stability in the dry and in the wet state, their proton conductivity and their fuel cell performance.

It has been found that the membranes of the invention are distinguished by excellent electrical properties. These include an ion conductivity of not less than 50 mS/cm (measured in contact with liquid water at room temperature by means of 4-pole impedance spectroscopy at a phase angle |Θ| of <1°).

It has been found that, while the mechanical properties are excellent, the proton conductivity is in the range 120–350 mS/cm at 80° C., (measured by the technique of 4-pole impedance spectroscopy in pure water).

Particularly preferred membranes are those which, besides the polymers of the invention, have another polymer component, preferably a sulfonated, aminated or else underivatized aromatic polymer and, in particular, a polyether sulfone, polysulfone, benzimidazole or polyether ketone.

The membrane of the invention preferably has a residual solvent content of less than 0.5% by weight.

The invention also relates to a method for producing the membrane defined hereinbefore, comprising the measures of:
  (i) dissolving a polymer of the invention or its salt form, where appropriate together with other membrane-forming polymers, in an aprotic organic solvent,
  (ii) spreading the solution on a support, and
  (iii) evaporating the solvent to form the membrane.

The polymers of the invention are normally dissolved in an aprotic organic solvent, preferably in dimethylformamide (DMF), dimethylacetamide (DMAC), N-methyl-2-pyrrolidone (NMP) or dimethyl sulfoxide (DMSO); the concentration of the polymer therein is preferably between 3 and 30% by weight.

After the membrane has formed, remaining solvent or salts are removed by a suitable washing medium such as, for example, a 5% strength mineral acid in water.

The membranes of the invention can be employed wet and dry for further processing.

It has been found that membranes comprising the polymers of the invention can be used in particular for fuel cells with low or no moisture content, but also for so-called super-caps, that is to say capacitors with extremely high capacity. The membrane can also be used in electrodialysis or in ultrafiltration. The invention also relates to the use of the membranes for these applications.

It has additionally been found that membranes composed of polymers comprising the repeating structural unit of the formula I in which X is —$SO_2$— are distinguished by a high proton conductivity and are outstandingly suitable for use in fuel cells, in particular for fuel cells with low or no moisture content, but also for so-called super-caps, that is to say capacitors with extremely high capacity. The invention also relates to the use of these polymers for these areas of application.

The following examples illustrate the invention without limiting it.

General

The thermal properties of the polyether ketone were found by thermogravimetric and DSC investigations. Thermal degradation was observed for the polymers only above 500° C. The investigated polymers absorbed only small amounts of solvent and showed a glass transition above 150° C. The investigated polymers were soluble in small concentrations in highly polar solvents. The mechanical properties of the membranes produced therefrom were satisfactory.

By contrast, the thermal properties of the sulfonated polyether ketone showed escape of 10% water in the thermogravimetric investigation. The sulfonic acid group was eliminated from the polymers above 240° C., and degradation of the polymer framework was observable at 500° C. In the DSC investigation, the glass transition temperature of the polymer was found to be above 200° C. The produced membranes were mechanically stable. The membranes had mechanically adequate properties at the operating temperature of the fuel cell.

The conductivity of the sulfonated polymers was investigated by 4-pole impedance spectroscopy measurement in water, with the values measured for the proton conductivity being above 190 mS/cm in the moist state at 60° C. The values are considerably higher than the conductivities which can be achieved with conventional, commercially available polyether ether ketone (PEK type P22, supplied by Victrex, Hofheim), which are compared in table 1. The values for the conductivity were higher despite the IEC being lower. The membrane provided good outputs and high current densities on operation in a fuel cell.

EXAMPLE 1

Measurement of the Conductivities of Membranes Composed of the Polymers of the Invention and Composed of Conventional Sulfonated Polyether Ketones Table 1: Results of 4-pole impedance spectroscopy measurement in water

| Temp. [° C.] | Material: Unfluorinated PEK, IEC 2.13 meq/g Conductivity [S/cm] |
|---|---|
| 22 | 0.115 |
| 30 | 0.130 |

-continued

Material:
Unfluorinated PEK,
IEC 2.13 meq/g

| Temp. [° C.] | Conductivity [S/cm] |
|---|---|
| 40 | 0.149 |
| 50 | 0.167 |
| 60 | 0.187 |
| 70 | 0.177 |
| 80 | 0.164 |
| 80 | 0.160 |
| 70 | 0.148 |
| 60 | 0.136 |
| 50 | 0.124 |
| 40 | 0.110 |
| 30 | 0.096 |
| 23 | 0.086 |

Fluorinated PEK
IEC 1.95 meq/g

| Temp. [° C.] | Conductivity [S/cm] |
|---|---|
| 23 | 0.107 |
| 30 | 0.127 |
| 40 | 0.160 |
| 50 | 0.203 |
| 60 | 0.247 |
| 70 | 0.296 |
| 80 | 0.296 |
| 80 | 0.261 |
| 70 | 0.226 |
| 60 | 0.207 |
| 50 | 0.186 |
| 40 | 0.167 |
| 30 | 0.145 |
| 23 | 0.129 |

EXAMPLE 2

Preparation of a Sulfonated Polyether Ketone of the Invention 2.1: Preparation of poly(4,4'-hexafluoroisopropylidenedibenzoether-1,4-phenylenecarbonyl-1,4-phenylene)

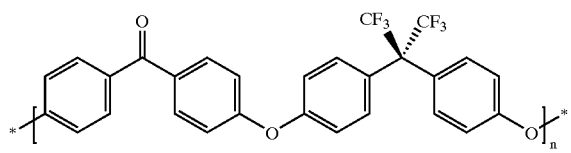

6.960 g (20.7 mmol) of 4,4'-(hexafluoroisopropylidene) diphenol and 4.510 g (20.7 mmol) of 4,4'-difluorobenzophenone were weighed out. Then 80 ml of DMAC (0.01% $H_2O$) were added and the mixture was stirred under argon until all the solid had dissolved with gentle heating. Under a stream of argon, 6.6 g (48 mmol) of dry potassium carbonate were added. The mixture was heated under argon to 160° C. over the course of 2 h and stirred at this temperature for 60 h. After the reaction solution had cooled it was introduced, stirring vigorously, into a mixture of 2 000 ml of distilled water and 20 ml of glacial acetic acid. The precipitated polymer was filtered off with suction and washed with distilled water and then with methanol. It was then dried to constant weight at 100° C. in a vacuum oven and the coarse product was then ground in an IKA type A 10 laboratory mill [yield: 10.378 g].

Characterization of the polymer afforded the following data:

TGA: the polymer structure was stable up to 500° C.

DSC: in the DSC investigation, water bound to the polymer vaporized, even during the second heating. A glass transition took place at $T_g=167°$ C., and this was also evident as crystallization on cooling.

IR ($v=[cm^{-1}]$): 1658 (V, C=O, m), 1595, 1510, 1501 (V, C=C, s), 1250 (V, C—O—C, vs 1206, 1174, (V, —$CF_3$, s)

GPC: $M_w=101\,800$ g/mol; $M_n=10\,500$ g/mol, U=8.670

2.2 Sulfonation of the polyether ketone prepared in example 2.1 to give poly(2-sulfo-4,'-hexafluoroisopropylidenedibenzoether-1,4-phenylenecarbonyl-1,4-phenylene)

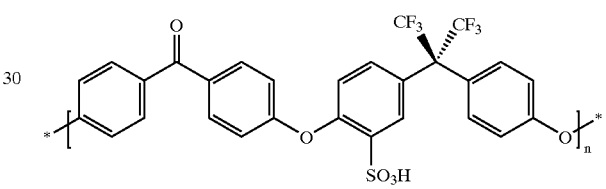

Sulfonation of the polyether ketone was carried out in concentrated sulfuric acid. For this purpose, 30.47 g (59.23 mmol) of polyether ketone were suspended in 600 ml of concentrated sulfuric acid at room temperature (25° C.). The temperature was monitored while stirring vigorously. The reaction mixture was left at this temperature for 1 h, and then the temperature was raised to 40° C. To dissolve the polymer, the temperature was increased to 60° C. The sulfonation also started under these conditions. After a further 2 h, the PEK polymer had completely dissolved. The generated sulfonated polymer was precipitated by adding 1 000 ml of deionized water. During the polymer precipitation a size reduction was carried out with an Ultra-Turrax, resulting in the polymer as white beads. The polymer obtained after filtration with suction was washed with water. Drying at room temperature was followed by predrying at 100° C. in a vacuum oven. After size reduction of the coarse product in a mill, it was washed with water until neutral. It was then dried to constant weight in a vacuum oven at 100° C. The degree of sulfonation was calculated from the ratio of the masses of sulfur and carbon from the results of the elemental analysis.

Elemental analysis of the sulfonated, fluorinated polyether ketone:

C 53.8%; H 1.7%; F 21.4%; O18.9%; S 6.1%,

TGA: a first step at T=90° C. had a 10.6% loss in mass up to 200° C. Elimination of the sulfonic acid groups took place in two steps between 240° C. to 300° C. and 300° C. to 500° C. The polymer structure of the sulfonated PEK remained stable up to 500° C.

DSC: a broad endothermic peak from RT to 220° C. was found, with a maximum at 104° C. A thermal transition at T=204° C. was observable in the second heating.

IR ($\bar{v}$=[cm$^{-1}$]): 1649 (V, C=O, m), 1594, 1501, 1486(V, C=C, s), 1249(V, C—O—C, vs), 1208, 1178, (V, —CF$_3$, s), 1094(V$_{asym}$, —SO$_3$—, W), 1030 (V$_{sym}$, —SO$_3$—, w)
Elemental analysis: C 52.8%; H 2.8%; F 17.3%; O 22.0%; S 6.4%, LOD 8.9%

$^1$H-NMR signals (400 MHz, DMSO, in ppm): δ=7.98 (d, 1H), δ=7.83 (d, 1H), δ=7.78 (t, 3H), δ=7.44 (d, 1H), δ=7.36 (d, 1H), δ=7.31 (s, 1H), δ=7.24(dd, 2H), δ=7.07(dd, 4H).

$^{13}$C-NMR signals (100 MHz, DMSO, in ppm): δ=193, 173, 161, 159, 157, 153, 139, 132, 130, 127, 125, 123, 121, 119, 118, 63

EXAMPLE 3

Membrane Production and Fuel Cell Test

3.1 Membrane Production

Proton-conducting membranes were produced from a 17% strength (w/w) NMP solution of the polyether ketone using the sulfonated polyether ketone prepared as in example 2. For this purpose, the polymer was dissolved in NMP and, after filtration, applied by a knife to a glass plate to give a thin layer with a thickness of about 0.25 mm. The film was then dried without preheating in a circulating oven at 100° C. for at least 10 hours. It was detached from the glass plate after placing in deionized water. The moist, swollen film is clamped on a plate and dried in air in order to obtain a smooth homogeneous membrane.

3.2 Fuel Cell Test:

A membrane electrode unit was produced from the membrane by pressing with two electrodes as described in WO 97/20358 (0.35 mg PVcm$^2$ side). This was installed in a stainless steel fuel cell. The electrodes were contacted with a pure nickel grid. The temperature of the cell during the measurement was 60° C., and the temperature of the humidifier was 85° C. The fuel gas used was pure hydrogen, and the oxidizing agent was air. The hydrogen side was operated in "dead-end mode" without humidification.

The following current-voltage curve was measured:

| Power [W] | Current [A] | Current density [mA/cm$^2$] | Voltage [mV] | Power density [mW/cm$^2$] | Cell temp. [° C.] |
|---|---|---|---|---|---|
| — | — | — | 980 | — | 60 |
| 0.424 | 0.5 | 40 | 848 | 33.65 | 60 |
| 0.820 | 1 | 79 | 820 | 65.08 | 60 |
| 1.570 | 2 | 159 | 785 | 124.60 | 60 |
| 2.271 | 3 | 238 | 757 | 180.24 | 60 |
| 2.928 | 4 | 317 | 732 | 232.38 | 60 |
| 3.525 | 5 | 397 | 705 | 279.76 | 60 |
| 4.068 | 6 | 476 | 678 | 322.86 | 60 |
| 4.536 | 7 | 556 | 648 | 360.00 | 60 |
| 4.992 | 8 | 635 | 624 | 396.19 | 60 |
| 5.166 | 9 | 714 | 574 | 410.00 | 60 |
| 5.450 | 10 | 794 | 545 | 432.54 | 60 |
| 5.478 | 11 | 873 | 498 | 434.76 | 60 |
| 5.580 | 12 | 952 | 465 | 442.86 | 60 |
| 4.056 | 13 | 1032 | 312 | 321.90 | 60 |
| 4.992 | 12 | 952 | 416 | 396.19 | 60 |
| 5.346 | 11 | 873 | 486 | 424.29 | 60 |
| 5.560 | 10 | 794 | 556 | 441.27 | 60 |
| 5.292 | 9 | 714 | 588 | 420.00 | 60 |
| 5.040 | 8 | 635 | 630 | 400.00 | 60 |
| 4.550 | 7 | 556 | 650 | 361.11 | 60 |
| 4.092 | 6 | 476 | 682 | 324.76 | 60 |
| 3.550 | 5 | 397 | 710 | 281.75 | 60 |
| 2.932 | 4 | 317 | 733 | 232.70 | 60 |
| 2.274 | 3 | 238 | 758 | 180.48 | 60 |
| 1.588 | 2 | 159 | 794 | 126.03 | 60 |
| 0.835 | 1 | 79 | 835 | 66.27 | 60 |
| 0.431 | 0.5 | 40 | 861 | 34.17 | 60 |
| 0.000 | 0 | — | 985 | — | 60 |

The invention claimed is:

1. A sulfonated aromatic polyetherketone polymer a comprising the repeating structural unit of the formula (I)

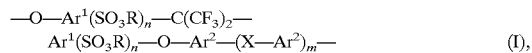
   —O—Ar$^1$(SO$_3$R)$_n$—C(CF$_3$)$_2$—
   Ar$^1$(SO$_3$R)$_n$—O—Ar$^2$—(X—Ar$^2$)$_m$—    (I), in which Ar$^1$ and Ar$^2$ are, independently of one another, divalent aromatic or heteroaromatic radicals which are optionally substituted by one or more monovalent organic groups which are inert under the conditions of use or sulfonic acid groups, R is hydrogen, an alkali metal or alkaline earth metal ion or an ammonium ion, n is an integer from 1 to 3, m is 1 or 2 and X is a —CO—, —O—, —C$_p$H$_{2p}$—, —C$_p$F$_{2p}$— or —S— group, in which p is an integer from 1 to 10 and which has an ion exchange capacity of between 0.5 and 3.0 meq (—SO$_3$H)/g of polymer.

2. A sulfonated aromatic polymer as claimed in claim 1, which besides the repeating structural unit of the formula I, comprises the repeating structural unit of the formula II

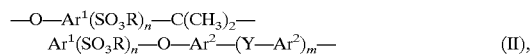
   —O—Ar$^1$(SO$_3$R)$_n$—C(CH$_3$)$_2$—
   Ar$^1$(SO$_3$R)$_n$—O—Ar$^2$—(Y—Ar$^2$)$_m$—    (II), in which Ar$^1$, Ar$^2$, R, m and n have the meaning defined in claim 1, and Y is a —CO—, —O—, —C$_p$H$_{2p}$—, —C$_p$F$_{2p}$—, —S— or —SO$_2$— group in which p is an integer from 1 to 10.

3. The sulfonated aromatic polymer as claimed in claim 1, wherein X is —CO—.

4. The sulfonated aromatic polymer as claimed in claim 1, wherein Ar$^1$ and Ar$^2$ are, independently of one another, phenylene, naphthylene or biphenylene.

5. The sulfonated aromatic polymer as claimed in claim 1, which further comprises the repeating structural unit of the formula III

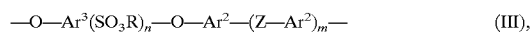
   —O—Ar$^3$(SO$_3$R)$_n$—O—Ar$^2$—(Z—Ar$^2$)$_m$—    (III), in which Ar$^2$, R, m and n have the meaning defined in claim 1, Z is a —CO—, —O—, —C$_p$H$_{2p}$—, —C$_p$F$_{2p}$—, —S— or —SO$_2$— group in which p is an integer from 1 to 10, and Ar$^3$ is a divalent aromatic or heteroaromatic radical which is optionally substituted by one or more monovalent organic groups which are inert under the conditions of use.

6. The sulfonated aromatic polymer as claimed in claim 5, wherein the molar proportion of the repeating structural unit of the formula I is 10–50% and the molar proportion of the repeating structural unit of the formula III is 90–50%.

7. A sulfonated aromatic polymer which consists essentially of the repeating structural unit of the following formula:

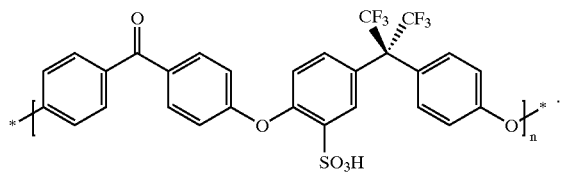

8. A membrane comprising the sulfonated polymer as claimed in claim 1.

9. The membrane as claimed in claim 8, which has a proton conductivity in contact with liquid water, determined by impedance spectroscopy in water at 80° C., of between 120 and 350 mS/cm.

10. The membrane as claimed in claim 8, which comprises as further polymer component a sulfonated, aminated or else underivatized aromatic polymer.

11. The membrane as claimed in claim 8, which has a thickness of between 10 and 150 μm.

12. A method for producing a membrane as claimed in claim 8, comprising the steps of:
(i) dissolving a sulfonated aromatic polymer comprising the repeating structural unit of the formula (I) or its salt form, —O—Ar$^1$(SO$_3$R)$_n$—C(CF$_3$)$_2$—Ar$^1$(SO$_3$R)$_n$—O—Ar$^2$—(X—Ar$^2$)$_m$— (I), in which Ar$^1$ and Ar$^2$ are, independently of one another, divalent aromatic or heteroaromatic radicals which are optionally substituted by one or more monovalent organic groups which are inert under the conditions of use or sulfonic acid groups, R is hydrogen, an alkali metal or alkaline earth metal ion or an ammonium ion, n is an integer up is an integer from 1 to 3, m is 1 or 2 and X is a —CO—, —O—, —C$_p$H$_{2p}$—, —C$_p$F$_{2p}$— or —S— group, in which p is an integer from 1 to 10,
in an aprotic organic solvent,
(ii) spreading the solution on a support, and
(iii) evaporating the solvent to form the membrane.

13. The method for producing a membrane as claimed in claim 12, wherein the solution is DMF, DMAC, NMP or DMSO and said polymer has a concentration being between 3 and 30% by weight.

14. The method for producing a membrane as claimed in claim 12, wherein the salt forms of the polymer are employed and wherein the salt forms can be converted into the acid form by treatment with an acid after production of the membrane.

15. The method for producing a membrane as claimed in claim 12, wherein the remaining solvent or salts are removed after the membrane production by a washing medium.

16. The sulfonated aromatic polymer as claimed in claim 2, wherein Ar$^1$ and Ar$^2$ are, independently of one another, 1,3-phenylene or 1,4-phenylene.

17. The sulfonated aromatic polymer as claimed in claim 1, wherein Ar$^1$ and Ar$^2$ are, independently of one another, 1,3-phenylene or 1,4-phenylene.

18. The sulfonated aromatic polymer as claimed in claim 2, which further comprises the repeating structural unit of the formula III —O—Ar$^3$(SO$_3$R)$_n$—O—Ar$^2$—(Z—Ar$^2$)$_m$— (III), in which Ar$^2$ is a divalent aromatic or heteroaromatic radicals which is optionally substituted by one or more monovalent organic groups which are inert under the conditions of use or sulfonic acid groups,
R is hydrogen, an alkali metal or alkaline earth metal ion or an ammonium ion,
n is an integer from 1 to 3, m is 1 or 2,
Z is a —CO—, —O—, —C$_p$H$_{2p}$—, —C$_p$F$_{2p}$—, —S— or —SO$_2$— group in which p is an integer from 1 to 10, and Ar$^3$ is a divalent aromatic or heteroaromatic radical which is optionally substituted by one or more monovalent organic groups which are inert under the conditions of use.

19. The sulfonated aromatic polymer as claimed in claim 18, wherein the molar proportion of the repeating structural unit of the formula I and formula II is 10–50% and the molar proportion of the repeating structural unit of the formula III is 90–50%.

20. The sulfonated polymer as claimed in claim 19, which has an ion exchange capacity of between 1.0 and 2.0 meq (—SO$_3$H)/g of polymer.

21. The membrane as claimed in claim 8, which comprises as further polymer a polyether sulfone, polysulfone, polybenzimidazole or polyether ketone and the membrane has a thickness of between 20 and 60 μm.

22. The membrane as claimed in claim 14, wherein said salt forms of the polymer are NH$_4$, Li, Na or K salts.

23. The method as claimed in claim 15, wherein said washing medium is a 5% strength mineral acid in water.

24. A fuel cell which comprises the membrane as claimed in claim 8.

25. The fuel cell as claimed in claim 24, wherein the fuel cell is a direct methanol fuel cell.

26. A high-performance capacitor which comprises the membrane as claimed in claim 8.

27. A dialysis apparatus which comprises the membrane as claimed in claim 8.

* * * * *

UNITED STATES PATENT AND TRADEMARK OFFICE
CERTIFICATE OF CORRECTION

PATENT NO. : 6,994,788 B1
APPLICATION NO. : 09/914704
DATED : February 7, 2006
INVENTOR(S) : Alexander Dyck et al.

It is certified that error appears in the above-identified patent and that said Letters Patent is hereby corrected as shown below:

In Claim 12, at column 11, line 37, "up is an integer from 1 to 3, m is 1 or 2 and X is a-CO-," should read --from 1 to 3, m is 1 or 2 and X is a-CO-,--

Signed and Sealed this

First Day of August, 2006

JON W. DUDAS
*Director of the United States Patent and Trademark Office*